United States Patent [19]

Mohr et al.

[11] 4,237,397
[45] Dec. 2, 1980

[54] ELECTRIC MACHINE, ESPECIALLY SMALL MOTOR

[75] Inventors: Adolf Mohr, Bühlertal; Rainer Corbach, Olfen, both of Fed. Rep. of Germany

[73] Assignee: Robert Bosch GmbH, Stuttgart, Fed. Rep. of Germany

[21] Appl. No.: 85,513

[22] Filed: Oct. 17, 1979

[30] Foreign Application Priority Data

Oct. 18, 1978 [DE] Fed. Rep. of Germany ....... 2845264

[51] Int. Cl.³ .......................................... H02K 21/26
[52] U.S. Cl. .................................... 310/154; 310/156
[58] Field of Search .............. 310/181, 154, 156, 152; 335/296

[56] References Cited

U.S. PATENT DOCUMENTS

| | | | |
|---|---|---|---|
| 3,567,979 | 3/1971 | Jaffe et al. | 310/154 X |
| 3,590,293 | 6/1971 | Susdorf | 310/154 |
| 3,594,599 | 7/1971 | West | 310/154 X |
| 4,110,718 | 8/1978 | Odor et al. | 310/154 X |
| 4,112,320 | 9/1978 | Mohr | 310/154 |

*Primary Examiner*—Donovan F. Duggan
*Attorney, Agent, or Firm*—Michael J. Striker

[57] ABSTRACT

A permanent magnet stator having two arcuate permanent magnet segments, each composed of two subsegments.

2 Claims, 2 Drawing Figures

ELECTRIC MACHINE, ESPECIALLY SMALL MOTOR

BACKGROUND OF THE INVENTION

The present invention concerns electric machines, especially but not exclusively small motors, whose field is established by permanent magnets, in particular at least one pair of diametrically located field magnets which define a radial air gap with the armature of the machine and each having the form of a generally arcuate permanent-magnet segment, as so called here. Typically, the radial thickness of each permanent-magnet segment decreases in the circumferential direction of the motor in either direction towards the ends of the magnet segment, the radial thickness of the air gap increasing in correspondence thereto.

In this type of permanent-magnet-field electric machine or motor, the progressive increase of the radial length of the machine's air gap proceeding in the direction towards either end of each permanent-magnet segment serves to suppress the magnetic noise of the machine or motor. Especially when use is made of permanent magnets having high magnetic values and accordingly high energy densities, the level of force to which the successive teeth of the motor's rotating armature are subjected is greatly increased on account of the increased magnetic flux passing through the armature teeth. The increased energy density of the permanent magnets produces increased air-gap induction which results in an enormous discontinuity in the flux passing through the armature teeth as they successively move into the working field of the permanent magnets; this, in turn, results in a very considerable increase in that noise whose fundamental frequency corresponds to the rate at which successive armature teeth pass the permanent-magnet segments. Indeed, it is to lower this magnetic noise down to a more normal level that use can in particular be made of the technique mentioned above, namely using an air gap whose radial length increases progressively towards either end of each permanent-magnet segment, inasmuch as this serves to reduce the flux passing through the air gap in the region of the two ends of each such magnet segment.

However, it is to be noted that the magnetic actions which tend to demagnetize the permanent-magnet segments to sucha machine or motor, attributable to the quadrature field of the machine's armature, are of greater and greater potentially demagnetizing effect as one proceeds towards the trailing end of each permanent-magnet segment, i.e., the end of the segment last reached by an arbitrarily selected point on the rotating armature. Furthermore, the ability of such permanent-magnet segment to withstand demagnetizing forces decreases with decreasing radial thickness of the magnet segment. As a result, if the radial thickness of the magnet segment is made progressively smaller towards its ends in order to suppress magnetic noise in the manner set forth above, this has the simultaneous and very undesirable effect of increasing the magnet segments' susceptibility to demagnetization.

It is already known to attempt to provide permanent-magnet segments of greater resistance to demagnetization, by forming such magnet segment from two subsegments, each made of a magnetic material of different respective magnetic characteristics, in particular one material being of higher remanence and the other having a higher coercive force. The danger of demagnetization, which arises most especially during start-up at low operating temperatures, exists most markedly at the trailing ends of the permanent-magnet segments because, as already indicated, it is there that the armature quadrature field is strongest. For this reason, the permanent-magnet subsegment of higher coercive force but lower magnetic remanence has conventionally been made the trailing one of the subsegments of the permanent-magnet segment. Then, in order to optimize the utilization of the total volume available for each such permanent-magnet segment, the ratio of the volume of the subsegment of higher coercive force to the total volume of the magnet segment has been made equal to the ratio of the coercive force of the higher-remanence material to the coercive force of the lower-remanence material. Such permanent magnets are usually denoted two-component magnets.

If one attempts to use two-component permanent magnets as the permanent-magnet segments of such machine, i.e., in order to compensate for the increased susceptibility to demagnetization, this does not actually lead to an overall improvement. Two-component permanent-magnet segments have been found to become demagnetized at the abutment joints between their two component subsegments.

SUMMARY OF THE INVENTION

It is a general object of the invention to provide a motor or machine of the type in question so designed that, without any sacrifice in the suppression of magnetic noise, the permanent-magnet segments of the motor are imparted a greater resistance to the demagnetizing effect of the armature quadrature field.

In accordance with the present invention, this is achieved by dimensioning the permanent-magnet segments in a novel way, described in detail below. When dimensioned in the novel manner of the present invention, the permanent-magnet segments of the motor are optimally utilized with regard to their potential energy content, without exceeding the limit field intensities of the two magnetic materials of each such magnet segment, i.e., without exceeding those field intensity values which, if exceeded, result in persisting demagnetization.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
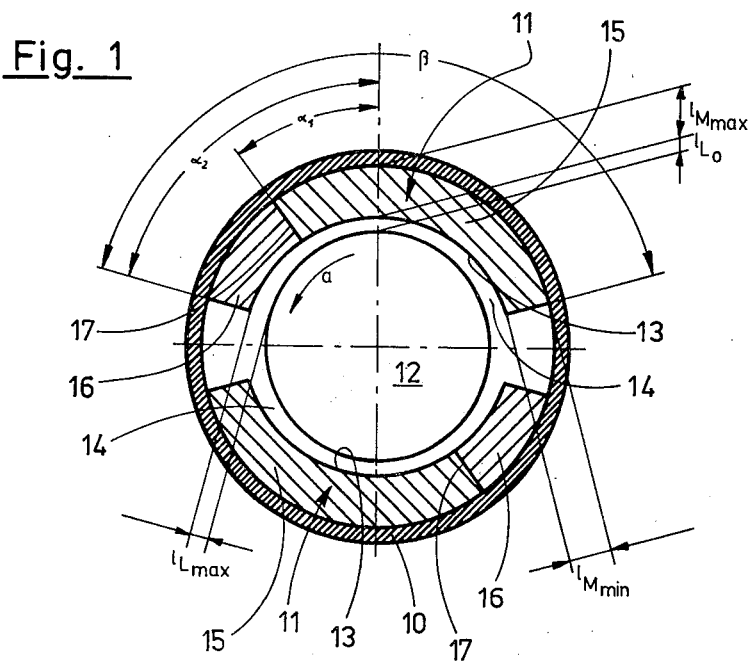
FIG. 1 is a transverse cross-section through the armature and magnet structure of a small motor embodying the present invention.

A small electric motor embodying the present invention is depicted in FIG. 1 in as much detail as needed for an understanding of the invention. In FIG. 1, numeral 10 denotes the motor's yoke, made of ferromagnetic material and forming part of the field magnet system of the motor. Yoke 10 at its interior periphery mounts two diametrically oppositely located permanent-magnet segments 11. An armature 12 rotates interiorly of the stationary magnet system of the motor and is provided with (non-illustrated) conventional armature slots in which the winding of the armature is laid. In the illustrated embodiment, the armature 12 rotates counterclockwise, as indicated by arrow a in FIG. 1.

Each of the two permanent-magnet segments 11 is of generally arcuate shape, and has a radial thickness which decreases proceeding in the circumferential direction from the middle portion of each magnet segment 11 to either of its two ends, such that the inner peripheral surfaces 13 of the two magnet segments 11 define air gaps 14 which are of increasing radial length proceeding circumferentially from the middle of either magnet segment 11 to either of its two ends. Midway between the ends of each permanent-magnet segment 11, the air gap 14 has a radial length $l_{Lo}$ whereas at either end of each magnet segment 11 air gap 14 has a radial thickness of $l_{Lmax}$. The radial thickness of each magnet segment 11 is $l_{Mmax}$ midway between its two respective ends and is $l_{Mmin}$ at its two ends. The magnet segments 11 are so dimensioned and located relative to armature 12 that the progressive decrease of the segment's radial thickness from $l_{Mmax}$ to $l_{Mmin}$ proceeding from the middle towards either end of each segment is matched by an exactly equal progressive increase of the radial length of the air gap from length $l_{Lo}$ at the middles of each magnet segment to $l_{Lmax}$ at either end of each magnet segment. Accordingly, the sum of the radial length of the air gap 14 and the radial thickness of each magnet segment 11 is constant, proceeding from one to the opposite end of each magnet segment, i.e., $$l_{Mmin} + l_{Lmax} = \text{const.} \quad (1)$$

and $$l_{Mmax} + l_{Lmin} = \text{const.} \quad (2)$$

Figure 2:
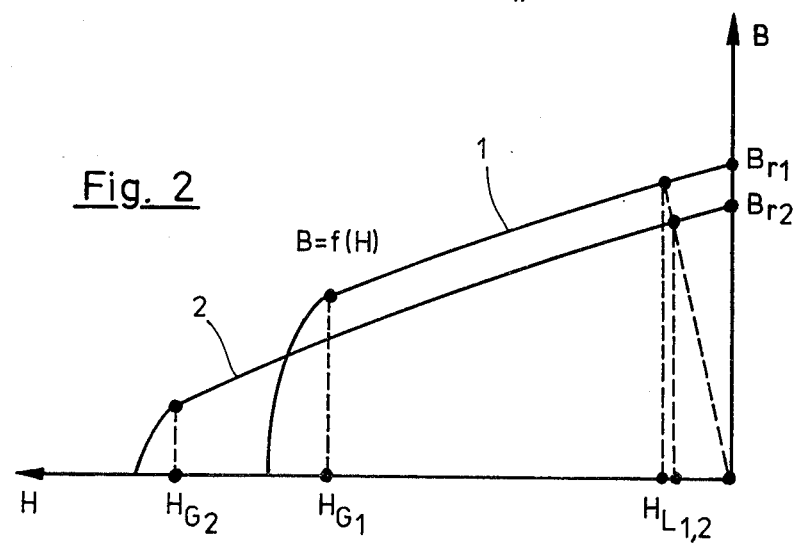
FIG. 2 depicts the demagnetization curves of the two magnetic materials of which each of the permanent-magnet segments of the motor of FIG. 1 is comprised.

I.e., the two permanent-magnet segments 11 are each of symmetrical configuration. Each permanent-magnet segment 11 is comprised of two subsegments 15, 16 of differing respective magnetic materials. As indicated in FIG. 2, one magnetic material, denoted by numeral 1, is of higher magnetic remanence than the other magnetic material, denoted by numeral 2. On the other hand, magnetic material 2 has a higher coercive force than magnetic material 1. In the case of each of the two permanent-magnet segments 11, the subsegment 15 is made of the higher-remanence magnetic material 1 of FIG. 2. The subsegment 16 is made of the higher-coercive-force magnetic material 2 of FIG. 2. The subsegment 16 is located at the trailing end of its respective magnet segment 11, i.e., downstream of subsegment 15 as considered in the direction of armature rotation.

The two permanent-magnet segments 11 are each so dimensioned that at each of the two ends of each segment 11 the radial thickness $l_{Lmin}$ of the segment 11 satisfy the relationship:

$$l_{M \, min} = \frac{w I_e}{H_{G2}} \cdot \frac{\beta/2}{90} + l_{Lmax}\left(\frac{B_{r2}}{\mu_o \cdot H_{G2}} - 1\right) \quad (3)$$

wherein
$w \cdot I_e$ = the armature quadrature mmf, $H_{G2}$ = the limit field strength of the magnet subsegment 16 of higher-coercive-force material (FIG. 2), $B_{r2}$ = the remanent induction of the higher-coercive-force material of magnet subsegment 16 (FIG. 2), $\beta$ = the angular span of permanent-magnet segment 11, $\mu_o$ = the magnetic permeability of free space, and $l_{Lmax}$ = the radial length of the air gap 14 at the ends of a permanent-magnet segment 11 (FIG. 1).

The expression limit field strength of a magnetic material is to be understood to be that field strength up to which the magnetic material can be demagnetized without undergoing irreversible demagnetization. The limit field strengths are marked at the knees of the magnetization curves B=f(H) in FIG. 2.

The decrease of the radial thickness $l_M$ of magnet segment 11 from its middle towards its ends is a linear function of angular location. Accordingly, the radial length $l_L$ of the air gap 14 increases as a linear function of angular location, proceeding from the middle to the ends of either magnet segment 11.

The two subsegments 15, 16 of each permanent-magnet segment 11 abut each other at an abutment joint 17 whose angular distance, measured in degrees, from the angular location of the middle of the respective segment 11 is in accordance with the relationship:

$$\alpha_1 = \frac{(l_L + l_M)\left(H_{G1} - \frac{B_{r1}}{\mu_o} \cdot l_{Lo}\right)}{\frac{w \cdot I_e}{90} + \frac{B_{r1}}{\mu_o} \cdot \frac{\Delta l_L}{\beta/2}} \quad (4)$$

wherein:
$l_{Lo}$ = the radial thickness of the air gap midway between the ends of a segment 11, $\Delta l_L$ = the amount of the increase in radial air-gap length at the ends of each segment 11, $H_{G1}$ = the limit field strength of the higher-remanence material of the magnet subsegment 15 (FIG. 2), and $B_{r1}$ = the remanence of the higher-remanence magnetic material of magnet subsegment 15 (FIG. 2).

From the foregoing, it follows that:

$$l_M + l_L = l_{Mmin} + l_{Lmax} = \text{const.} \quad (5)$$
$$= l_{Mmin} + (l_{Lo} + \Delta l_L)$$

The ratio of the volume $V_2$ of the subsegment 16 to the total volume $V_{tot}$ of the whole magnet segment 11 is given by:

$$\frac{V_2}{V_{tot}} = \frac{1}{2}\left(1 - \frac{H_{G1} - H_2(\alpha_1)}{H_{G2} - H_2(\alpha_2)}\right) \cdot 100\% \quad (6)$$

wherein $$H_2(\alpha_1) = \frac{B_{r1}/\mu_o}{l_L + l_M}\left(l_{Lo} + \Delta l_L \cdot \frac{\alpha_1}{\beta/2}\right) \quad (7)$$

and wherein $$H_2(\alpha_2) = \frac{B_{r2}/\mu_o}{l_L + l_M} \cdot l_{Lmax} \quad (8)$$

NUMERICAL EXAMPLE

A numerical example in which the permanent-magnet segments 11 are dimensioned in accordance with the foregoing is presented as follows:

$w \cdot I_e = 4130$ A $\beta = 140°$ $l_{Lo} = 0.05$ cm $\Delta l_L = 0.15$ cm $H_{Gl} = 230$ kA/m $= 2300$ A/cm $B_{rl} = 400$ mT $= 4000$ G $H_{G2} = 500$ kA/m $= 5000$ A/cm $B_{r2} = 230$ mT $= 2300$ G.

With the numerical values just listed as givens, the radial thickness $l_{Mmin}$ of each magnet segment 11 at its ends is in accordance with equation (3), as follows:

$$l_{Mmin} = \frac{4130}{5000} \cdot \frac{70}{90} + (0.05 + 0.15)\left(\frac{2300}{1.256 \cdot 5000} - 1\right)$$
$$= 0.496 \text{ cm}.$$

In accordance with equation (5):

$l_L + l_M = \text{const.} = 0.696$ cm.

In accordance with equation (4) the abutment joint 17 is spaced an angular distance $\alpha_1$ from the midway point of the magnet segment by an amount:

$$\alpha_1 = \frac{0.696 \cdot \left(2300 - \frac{4000}{1.256} \cdot 0.05\right)}{\frac{4130}{90} + \frac{4000}{1.256} \cdot \frac{0.15}{70}} = 27.4$$

With permanent-magnet segment 11 thusly dimensioned, then in accordance with equation (7):

$$H_2(\alpha_1) = \frac{4000/1.256}{0.696} \left(0.05 + 0.15 \cdot \frac{27.4}{70}\right)$$
$$= 497 \text{ A/cm}$$

and in accordance with equation (8):

$$H_2(\alpha_2) = \frac{2300/1.256}{0.696} \cdot 0.2 = 526 \text{ A/cm}.$$

The volume $V_2$ of the magnet subsegment 16, expressed as a fraction of the total volume $V_{tot}$ of the magnet segment 11, is, in accordance with equation (6):

$$\frac{V_2}{V_{tot}} = \frac{1}{2}\left(1 - \frac{2300 - 497}{5000 - 526}\right) \cdot 100 = 30\%.$$

Accordingly, the volume $V_2$ of the magnet subsegment 16 amounts to 30% of the total volume of each segment 11, whereas the volume $V_1$ of subsegment 15 amounts to 70% of the total magnet-segment volume.

It has been ascertained that a two-material permanent-magnet segment 11 dimensioned in accordance with the numerical example just presented produces the same level of magnetic noise as a one-material magnet segment having the same spatial dimensions, but exhibits about twice the resistance to demagnetization exhibited by the comparable one-material magnet segment.

This enormous increase in the resistance to demagnetization is, admittedly, achieved with a limited sacrifice of induction, but the amount of the induction loss is not comparable to the useful value of induction remaining. The induction loss results from the fact that the magnetic material of the subsegment 16 has a smaller remanence than that of subsegment 15 at the abutment joint 17 between the two segments 15, 16, resulting in an abrupt induction drop. Accordingly, the effective remanence induction of the permanent-magnet segment 1 of FIG. 1 is somewhat lower than the remanence of an indentically dimensioned one-material magnet segment whose material has the same remanence as the material here used for subsegment 15. The two-material magnet segment 11 of the numerical example set forth above, compared to an identically dimensioned segment all of whose material has the higher of the two remanence values (400 mT), has an effective remanence value equal to about 89% of the comparable one-material magnet segment; i.e., the induction loss amounts to about 11%.

The advantages of a machine whose permanent-magnet segments 11 have been dimensioned in accordance with the foregoing are, as stated earlier: low magnetic noise, great resistance to the demagnetizing effect of the armature quadrature field, and minimal volume of the permanent-magnet segments.

It will be understood that each of the elements described above, or two or more together, may also find a useful application in other types of constructions and dimensional relationships, differing from the types described above.

While the invention has been illustrated and described as embodied in the context of a small motor provided with only two diametrically located permanent-magnet segments, with each permanent-magnet segment consisting of two circumferentially successive subsegments, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An improved electric machine, of the type comprising an armature,
   a permanent-magnet field magnet system including at least two diametrically located permanent-magnet segments each of generally arcuate configuration,
   each permanent-magnet segment having two ends and a middle located midway between the two ends and having a radial thickness which decreases proceeding from the middle towards each of the two ends,
   each permanent-magnet segment defining together with the armature a radial air gap whose radial length increases proceeding from the middle of the respective segment towards each of the two ends in correspondence to the radial-thickness decrease in the segment,
   the improvement wherein:

each permanent-magnet segment comprises a first and a second subsegment respectively made of first and second magnetic materials, the first magnetic material having a higher remanence than the second magnetic material, the second magnetic material having a higher coercive force than the first magnetic material, the second subsegment being located more downstream than the first subsegment as considered in the direction of relative rotation of the armature and permanent-magnet segments, the sum of the radial length $l_L$ of the air gap and the radial thickness $l_M$ of each permanent-magnet segment being constant, the radial thickness $l_{Mmin}$ of each permanent-magnet segment at each of the two ends thereof being $$l_{Mmin} = \frac{w \cdot I_e}{H_{G2}} \cdot \frac{\beta/2}{90} + l_{Lmax}\left(\frac{B_{r2}}{\mu_o \cdot H_{G2}} - 1\right)$$

the two subsegments of each permanent-magnet segment adjoining each other at a junction location which is spaced from the middle of the respective permanent-magnet segment by an angular distance $\alpha_1$ such that $$\alpha_1 = \frac{(l_L + l_M)\left(H_{G1} - \frac{B_{r1}}{\mu_o} l_{Lo}\right)}{\frac{w \cdot I_e}{90} + \frac{B_{r1}}{\mu_o} \cdot \frac{\Delta l_L}{\beta/2}}$$

wherein:

$w \cdot I_e$ = the armature quadrature mmf of the motor, $H_{G2}$ = the field intensity up to which the second magnetic material can be demagnetized without undergoing irreversible demagnetization, $B_{r2}$ = the remanent induction of the second magnetic material, $\beta$ = the angular span of each permanent-magnet segment, $\mu_o$ = the magnetic permeability of free space, $l_{Lmax}$ = the radial thickness of the air gap measured at an end of a permanent-magnet segment, $l_{Lo}$ = the radial thickness of the air gap measured at the middle of a permanent-magnet segment, $\Delta l_L$ = the amount by which the radial thickness of the air gap measured at a segment end exceeds that measured at the middle of a segment, $H_{G1}$ = the field intensity up to which the first magnetic material can be demagnetized without undergoing irreversible demagnetization, and $B_{r1}$ = the remanent induction of the second magnetic material, 2. An electric machine as defined in claim 1, the ratio of the volume $V_2$ of the second subsegment of each permanent-magnet segment to the total volume $V_{tot}$ of the permanent-magnet segment being $$\frac{V_2}{V_{tot}} = \frac{1}{2}\left(1 - \frac{H_{G1} - H_2(\alpha_1)}{H_{G2} - H_2(\alpha_2)}\right) \cdot 100\%$$

wherein $$H_2(\alpha_1) = \frac{B_{r1}/\mu_o}{1_L + 1_M}\left(l_{Lo} + \Delta l_L \cdot \frac{\alpha_1}{\beta/2}\right)$$

and wherein $$H_2(\alpha_2) = \frac{B_{r2}/\mu_o}{1_L + 1_M} \cdot l_{Lmax}.$$

* * * * *